Jan. 13, 1970 W. M. WILSON 3,489,205
FLUID HANDLING MECHANISM
Filed Jan. 20, 1967 3 Sheets-Sheet 1

INVENTOR.
WARREN M. WILSON
BY Yount, Ramey, Flynn, & Tarolli
ATTORNEYS

INVENTOR.
WARREN M. WILSON

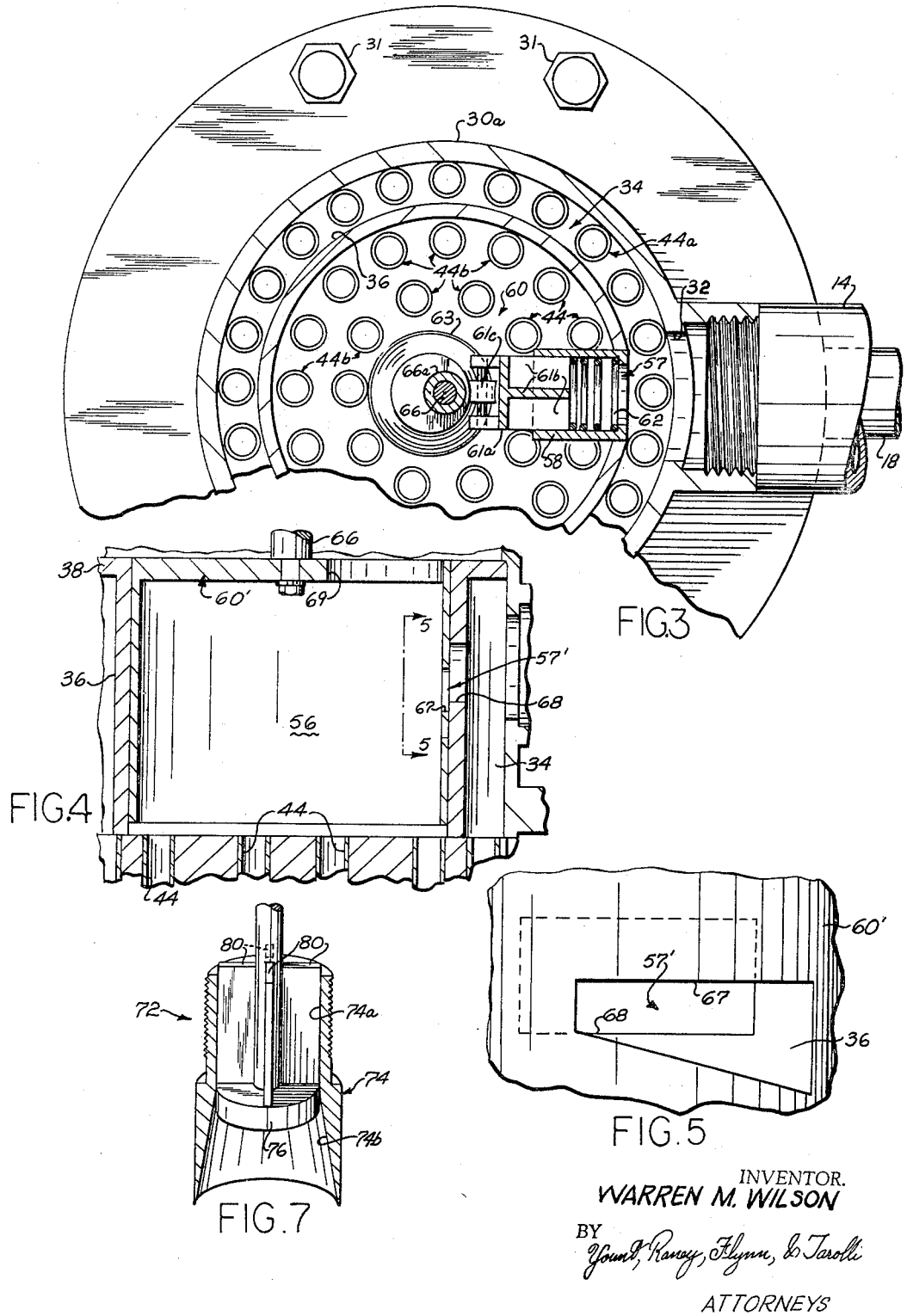

United States Patent Office 3,489,205
Patented Jan. 13, 1970

3,489,205
FLUID HANDLING MECHANISM
Warren M. Wilson, 809 Superior Drive,
Huron, Ohio 44839
Filed Jan. 20, 1967, Ser. No. 610,663
Int. Cl. G65d 23/00; B60h 1/00; F28h 27/00
U.S. Cl. 165—35          32 Claims

ABSTRACT OF THE DISCLOSURE

A fluid handling mechanism in which one fluid is heated by another fluid to a predetermined temperature. The fluids are introduced into a heat exchanger and the heated fluid is discharged therefrom in accordance with the demand. During no demand or zero duty operation, no flow of heating fluid occurs and this control condition eliminates overheating of the fluid. The temperature of the heated fluid is controlled during low duty operation of the mechanism by mixing relatively colder fluid with heated fluid according to a predetermined variable ratio. When the mechanism is operating at higher duty, the temperature is controlled by regulating the pressure of the heating fluid in the heat exchanger in accordance with the demand.

---

This application is related to applicant's copending application Ser. No. 554,402, now issued as U.S. Patent No. 3,391,729, and is entitled to the date thereof for the subject matter common therewith.

It is an important object of the present invention to provide a new and improved fluid handling mechanism, where during no flow of heated fluid, the flow of heating fluid is stopped also. This is required to prevent overheating of the fluid for safety, and since such overheating also induces rapid fouling of the heat exchange surface, it is to be eliminated.

Another object of the present invention is to provide a new and improved fluid handling mechanism for heating one fluid to a predetermined temperature by another fluid and wherein the temperature is controlled during low duty operation of the mechanism by mixing relatively colder fluid with the heated fluid within a chamber and during high duty operation of the mechanism, the temperature of the heated fluid is controlled by regulating the pressure of the heating fluid in the heat exchange chamber.

Another object of the present invention is the provision of a new and improved fluid handling mechanism, as noted in the next preceding paragraph, wherein the mechanism includes means for maintaining pressure of the heating fluid in the heat exchange chamber substantially constant during low duty operation and during high duty operation, substantially no mixing occurs but heating fluid pressure increases.

Still another object of the present invention is the provision of a new and improved fluid handling mechanism, as noted in the preceding paragraph, where low duty operation includes operation of the mechanism up to approximately 40 percent of capacity and the high duty operation includes operation above approximately 40 percent of capacity.

A further object of the present invention is the provision of a new and improved fluid handling mechanism wherein an adjustable valve, preferably externallly adjustable, is provided to produce the desired constant heating fluid pressure to the exchanger, when changing from no duty to minimum duty conditions, and the result induced by this adjustment is based on flow of heated fluid or demand upon the mechanism. Thus, the change from no demand to minimum demand condition can be made abruptly and without lag and the desired exit heated fluid temperature established instantaneously.

Still a further object of the present invention is the provision of a different adjustment than described in the preceding paragraph which makes it possible to change the magnitude of the constant heating fluid pressure for low duty operation. The purpose of this adjustment is to cope with heating fluid discharge pressure conditions external of the heat exchanger, and which may vary with each installation.

Another object of the present invention is to provide for an adjustment where the point of change from mixing at low duty operation to control of heating fluid pressure at high duty operation can be adjusted so that its location can be at any desired duty other than approximately 40 percent of rated capacity. However, it must be recognized that any value selected above approximately 40 percent of rated capacity produces inefficient use of the heat transfer surface.

Still another object of the present invention is to provide for an adjustment to change the heating fluid pressure during highest duty operation. Thus, two points of adjustment are provided, one at start of high duty operation, and the other at highest duty operation, and which will effectively integrate the mixing phase and the control of heating fluid pressure phase.

A further object of the present invention is the provision of a new and improved fluid handling mechanism for heating a first fluid by a second fluid and wherein the first fluid is heated by a second fluid in a first chamber in a housing and whereafter the first fluid flows into a second chamber having valve means therein which regulates the discharge of the first fluid from the housing according to the demand at a use location.

A still further object of the present invention is the provision of a new and improved fluid handling mechanism, as noted in the preceding paragraph, wherein the valve means includes a part movable in response to the demand for the first fluid and provides for flow of the first fluid through the valve.

Another object of the present invention is the provision of a new and improved fluid handling mechanism for heating a first fluid by a second fluid wherein the second fluid is introduced into a first chamber and the first fluid introduced into the first chamber through a fluid into chamber and is heated as it flows through a fluid conduit means in the first chamber and is discharged into a second chamber wherein unheated first fluid is by-passed from the fluid inlet chamber and mixes with the heated first fluid to control the temperature of the first fluid.

A further object of the present invention is the provision of a new and improved fluid handling mechanism, as noted in the preceding paragraph, wherein the first fluid is water and the second fluid is steam and the direct flow of colder water into the heated water in the second chamber is regulated by a mixing device which operates to mix hot and cold water up to a predetermined rate of flow of hot water from the mechanism.

Another object of the present invention is to provide an adjustment, preferably external, and wherein the temperature of the heated fluid at minimum duty condition can be shifted from a low to a high temperature, or vice versa, at will. This is during the mixing phase, and in effect this adjustment sets the amount of colder water that is admitted for mixing with heated water at minimum duty condition.

Still another object of the present invention, as noted in the preceding paragraph, is to provide means for effectively controlling the amount of colder water mixed with heated water during the change from minimum duty to approximataely 40 percent duty condition, so as to maintain the same temperature of heated fluid initially selected by means described in the preceding paragraph. A further object of the present invention is the provision of a new and improved fluid handling mechanism having first and second relatively moving parts which cooperate to regulate flow of fluid along a fluid conduit means, one of the parts being of tubular configuration and providing a valve member and the other of the parts being disposed within the tubular part and cooperating with the valve member to regulate the flow of fluid through the tubular part, one of the parts having a frusto-conical surface which provides for increased rate of flow through the tubular part as the relative movement of the parts in one direction increases.

A still further object of the present invention is the provision of a new and improved fluid handling mechanism including a heating apparatus in which a first fluid is heated by a second fluid and in which the ratae of flow of the second fluid into the apparatus is regulated by a pressure responsive valve which is loaded in accordance with the demand for heated fluid and a temperature responsive relief valve operates to relieve the pressure on the pressure responsive valve and close the pressure responsive valve when the temperature of the outlet water exceeds a predetermined temperature.

Another object of the present invention is the provision of a new and improved fluid handling mechanism for heating a first fluid by a second fluid in a heat exchange chamber where the first fluid is heated as it flows in plural paths through spaced conduits in the chamber, and wherein the first fluid is directed through outer conduits which provide for flow in a first direction and through inner conduits which provide for flow in an opposite direction.

Still another object of the present invention is to provide for two-pass flow of heated fluid in the heat exchanger in a unique manner, wherein at least one row of heated fluid conduits are annularly arranged and with an annular baffle member separating the outermost annular conduit arrangement from the rest of the conduits in such a manner that the flow of fluid to be heated is first in one direction in the outermost annular conduit arrangement, thence in the opposite direction in the balance of the conduits.

Yet another object of the present invention is to utilize conventional straight shell and tube heat exchanger which has wide acceptance in the world, and which can be mechanically cleaned in the field without difficulty.

A further object of the present invention is to provide an adjustment for shifting the starting point of the operating mechanism externally of the heat exchanger to compensate for manufacture tolerances.

Further objects and advantages of the present invention will be apparent from the following detailed description of a preferred embodiment thereof made with reference to the accompanying drawings forming a part of this specification and in which:

FIG. 3 is a sectional view of the fluid handling mechanism taken approximately along line 3—3 of FIG. 2;

FIG. 4 is a sectional view showing another mixing regulator which can be used in the fluid handling mechanism of the present invention;

FIG. 5 is a fragmentary elevational view of part of the mixing regulator, as viewed in the direction of arrows 5—5 of FIG. 4;

FIG. 7 is a perspective view partly in section of a part of the first fluid handling mechanism shown in FIG. 2;

Figure 6:
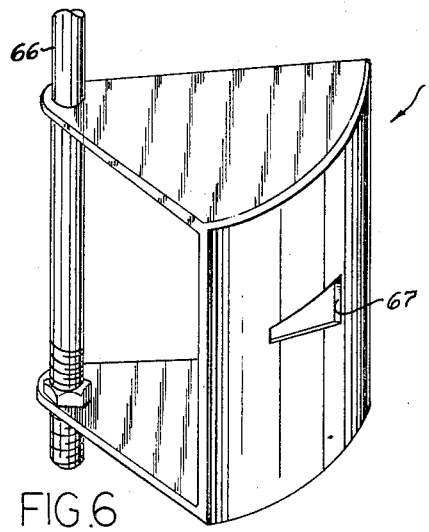
FIG. 6 is a perspective view of still another mixing regulator which can be used in the fluid handling mechanism of the present invention.
Figure 1:
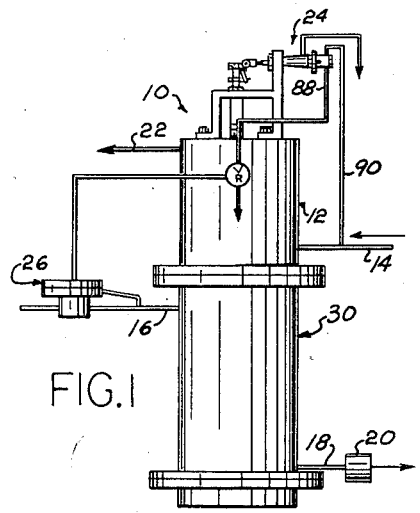
FIG. 1 is an elevational view of the fluid handling mechanism according to the present invention.

The present invention relates to a fluid handling mechanism for heating one fluid by another fluid. In the illustrated embodiment, the fluids are introduced into a heat exchange chamber where the first fluid is heated and discharged from the mechanism in accordance with the demand for the heated fluid at a location remote from the mechanism. The temperature of the heated fluid is controlled during low capacity operation of the mechanism by mixing unheated fluid with fluid heated in the heat exchange chamber according to a predetermined ratio. When the mechanism is operating at higher capacity, the temperature of the fluid is controlled by regulating the pressure of heating fluid in the heat exchange chamber in accordance with the demand for the heated fluid.

The embodiment of the present invention illustrated in the drawings comprises a fluid handling mechanism 10 which is suitable for heating a variety of fluids but will be hereinafter described as heating water by steam. The fluid handling mechanism 10 includes a heating apparatus 12 into which water is introduced through an inlet water conduit 14 and heated by steam introduced through a steam conduit 16. The water is heated by the steam as it circulates through the heating apparatus 12 and the heated water is discharged from the apparatus through a water outlet conduit 22. A valve, not shown, regulates the discharge of fluid through conduit 22 and establishes a demand for hot water on the fluid handling mechanism 10. The steam condensate is discharged from the heating apparatus 12 through a steam condensate line 18. The steam condensate line 18 has a steam trap 20 which is preferably vented to the atmosphere so as to maintain a minimum back pressure on the steam in the heating apparatus 12.

The fluid handling mechanism 10 also includes control means 24 mounted on the heating apparatus 12 and which operates to control a steam valve 26 which controls the flow of steam through steam conduit 16. Steam valve 26 is a commercially available reducing valve which is operated by differences in the fluid pressures acting on opposite sides of a diaphragm actuator to control the steam flow therethrough. One side of the diaphragm of steam valve 26 is loaded by the steam in conduit 16 and the other side of the diaphragm is loaded by the control means 24 in accordance with the demand for hot water placed on the mechanism 10.

Figure 2:
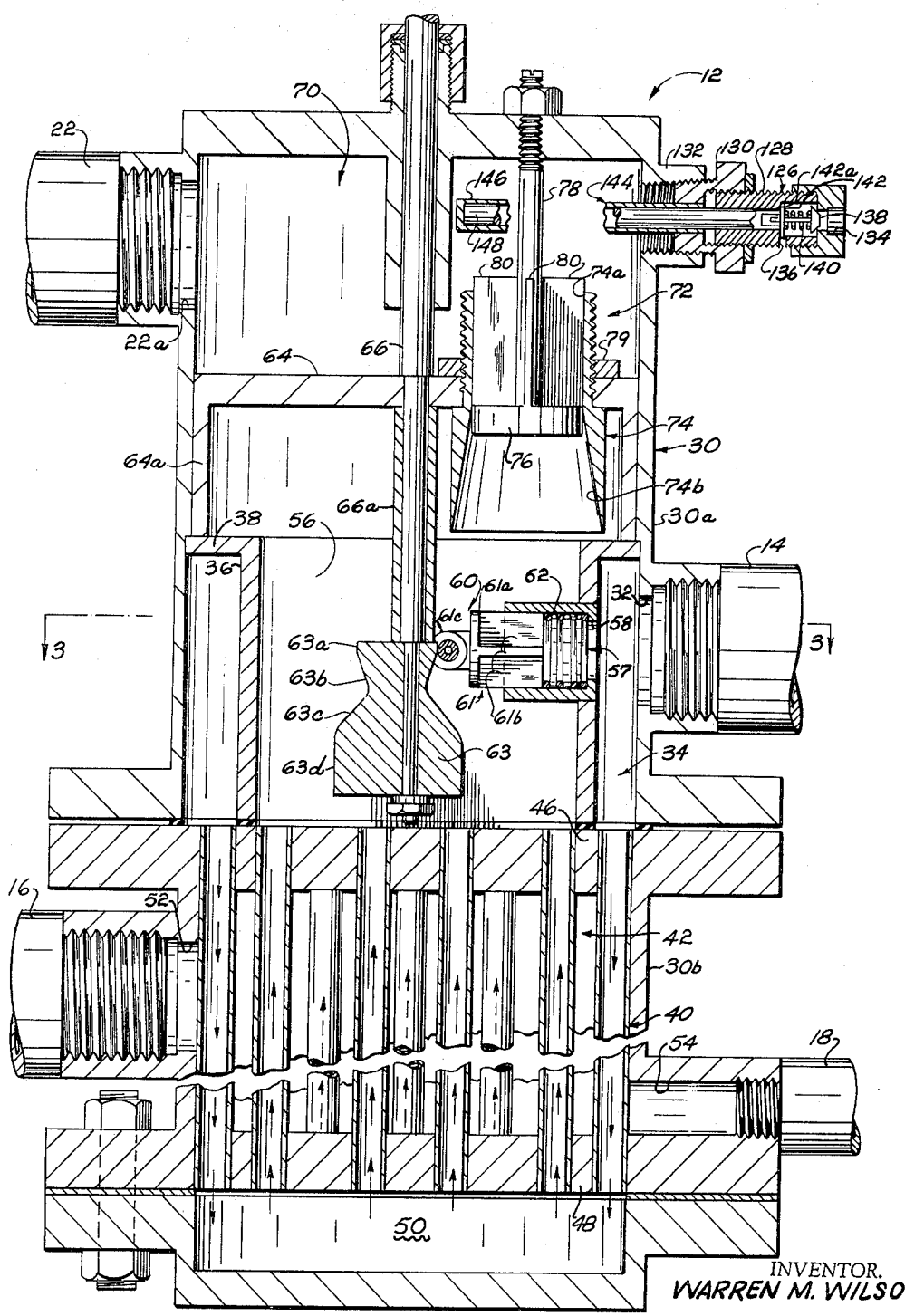
FIG. 2 is an axial sectional view of a portion of the fluid handling mechanism of FIG. 1.

The heating apparatus 12 comprises a housing or shell 30. The housing 30 is preferably of generally cylindrical shape and is formed in two parts, 30a and 30b, as shown in FIG. 2. Parts 30a and 30b are detachably connected by a plurality of suitable fasteners 31. The two-piece construction permits the heating apparatus to be disassembled for servicing.

The water to be heated is introduced into the heating apparatus 12 through an opening 32 in the upper housing part 30a. The opening 32 communicates with an annular water inlet chamber 34 provided in housing 30. The inlet chamber 34 is formed in part by an annular sleeve 36 having a flanged portion 38 by which the sleeve 36 is connected to the housing part 30a by suitable means, such as compression, so that it is readily removable. The fluid inlet chamber 34 communicates at its lower end with fluid conduit means 40 which circulates the water to be heated through a heat exchange chamber 42. The water is heated by the steam in heat exchange chamber 42 as it circulates through the fluid conduit means 40.

Fluid conduit means 40 comprises a circular array of spaced tubular members 44, as shown in FIG. 3, arranged in circular rows concentric with the central longitudinal axis of the heat exchange chamber 42. The tubular members 44 are open-ended tubes supported by members 46 and 48, as shown in FIG. 2. The members 46 and 48 maintain the tubes 44 in properly spaced relationship so that steam can flow about the tubes and prevent steam leakage from the heat exchange chamber 42.

The present invention provides for heating the water as it flows in parallel paths in opposite directions through the tubes 44. The water to be heated flows in a first direction through certain of the tubes 44 and in an opposite direction through the other tubes 44. The described flow of water through the chamber 42 permits the chamber 42 to be more compact in length and yet provides sufficient heat exchange between the steam and water to provide heated water at the desired temperature and volume. The outermost circumferential tubes 44a of the array are disposed with their upper open ends communicating with the lower end of water inlet chamber 34. Water in inlet chamber 34 flows downwardly through the outer tube 44a into a communicating reservoir 50. The lower ends of the inner tubes 44b of the array communicate with the communicating reservoir 50 so that water in the reservoir 50 is forced upwardly through the inner tubes 44b, as indicated by the arrows in FIG. 2.

The steam is introduced into the heat exchange chamber 42 through a suitable inlet opening 52 in the wall of the lower housing part 30b and to which steam conduit 16 is suitably connected. The steam in heat exchange chamber 42 flows about the space tubes 44 and is discharged from the heat exchange chamber 42 through a condensate discharge opening 54 provided in the lower housing part 30b and to which the steam condensate discharge conduit 18 is suitably connected.

The heated water is discharged from the upper end of the inner tubes 44b into a mixing area or chamber 56. It has been discovered that during low duty operation of the fluid handling mechanism 10, the temperature of the water discharged therefrom can be controlled by mixing colder water with the water which has been heated in the heat exchange chamber 42. Although the limits of low duty operation of the mechanism 10 are adjustable, the range found very suitable for controlling water temperature by mixing is from start-up to about 40 percent of capacity. The high duty operation would be from about 40 percent to 100 percent of capacity. During low duty operation, the pressure of steam in the heat exchange chamber 42 is maintained substantially constant and by controlling the volume of cold water mixed with the heated water, the temperature of the water discharged from the heating apparatus 12 can be regulated. Water of correct temperature leaves apparatus 12 via port 22a which connects to conduit 22.

The cold water used for mixing is preferably obtained from inlet chamber 34. The water in inlet chamber 34 is by-passed into mixing chamber 56 through a fluid passageway 57. The fluid passageway 57 is provided by a tubular member 58 received in an opening provided in the wall of sleeve 36. The flow of cold water through the passageway 57 is controlled by a mixing regulator 60.

The mixing regulator 60 includes a flow control member 61 which reciprocates in tubular member 58 to control flow of cold water into the mixing chamber 56. Flow control member 61 comprises a head portion 61a which is of a size and configuration to have a close sliding fit with the tubular member 58. When head portion 61a is positioned to engage the inner surface of tubular member 58, the flow of cold water into mixing chamber 56 is substantially blocked. The flow control member 61 further includes a plurality of vanes 61b which extend from one side of head 61a and a cam follower 61c on the opposite side of head portion 61a. The vanes 61b engage the inner walls of the tubular member 58 and guide the flow control member 61 into tubular member 58.

The flow control member 61 is biased to the left, as viewed in FIG. 2, by a coil spring 62 in the tubular member 58. Spring 62 maintains cam follower 61c in engagement with an eccentric cam 63. Cam 63 cooperates with spring 62 to control the position of head portion 61a relative to the tubular member 58. The position of head portion 61a relative to the tubular member 58 controls the volume of cold water mixed with the heated water in mixing chamber 56. The position of head portion 61a changes as the demand for hot water changes.

As the demand for hot water is initially established, the cold water mixed with the heated water represents a relatively large percentage of the low total volume of water discharged from the heating apparatus 12. It is necessary to provide such a ratio at start-up to bring the water to the desired temperature since the heated water is always above the desired use temperature. As the demand increases, a greater volume of cold water is mixed with the heated water but the volume of cold water represents a smaller percentage of the now higher total volume of water discharged from the mechanism 10. The mechanism 10 is preferably set so that the mixing stops when it is operating at about 40 percent of capacity and above.

The mixing regulator 60 provides the desired flow rate of cold water into the mixing chamber by moving cam 63 vertically relative to the cam follower 61c. Cam 63 comprises surface portions 63a, 63b, 63c and 63d. The cam follower 61c sequentially engages cam surface portions 63a, 63b, 63c and 63d as the cam 63 is moved vertically relative to the cam follower 61c and provides for positioning head 61a relative to the tubular member 58 to provide the desired flow pattern of cold water into the mixing chamber 56.

The cam 63 is moved vertically relative to cam follower 61c upon movement of piston 64. The piston 64 is mounted for reciprocation in the housing part 30a and moves in response to a difference in water pressure acting on the upper and lower sides thereof caused by a change in the demand for water. The piston 64 has a skirt portion 64a which has a complementary close siding fit with the inner surface of the housing part 30a so as to effectively seal the portions of the upper housing part 30a on opposite sides thereof. The lower end of piston skirt 64a seats on the flange portion 38 of the sleeve 36 when there is "no demand" on the mechanism 10. In this portion, the relative arrangement of the cam 63 and cam follower 61c is that shown in FIG. 2.

As demand for water is established, the piston 64 moves away from the flange 38 and effects movement therewith of the cam 63. The cam 63 is connected to the piston by a piston rod 66. The piston rod 66 extends through the piston head and through an opening in cam 63 which is offset from the central longitudinal axis of cam 63. The lower end of piston rod 66 receives a nut which secures the cam 63 on the lower end of the piston rod 66. A spacer sleeve member 66a extends between the piston 64 and the cam 63. The spacer 66a holds the piston 64 a fixed distance away from cam 63 and still permits rotation of piston rod 66 within the spacer 66a and piston 64. The spacer 66a also transmits downward movement of the piston 64 to the cam 63 so that they move downward as a unit.

At stagnant or "no demand," cam surface portion 63a is in engagement with cam follower 61c. As a demand for hot water is established, the cam 63 moves vertically with piston 64 and the cam follower engages the inclined surface portion 63b which positions head 61a farther from the tubular member 58 and provides for increased volume of flow of cold water into the mixing chamber 56. The volume of flow of cold water through passageway 57 increases until the cam follower 61c engages the reversely inclined cam surface portion 63c. The cam surface portion 63c gradually moves the head portion 61a toward the tubular member 58 thereby reducing the flow of fluid through passageway 57 into mixing chamber 56. When the apparatus 10 is operating preferably at about 40 percent capacity, the cam 63 has been moved vertically by piston 64 so that the cam surface portion 63d engages the cam follower 61c which moves the head 61a into engagement with the inner wall of tubular member 58 and stops flow of cold water into the mixing chamber. This discontinues the mixing operation. As the demand for water decreases, the reverse movement of cam 63 occurs.

It should be apparent that the temperature of the water is controlled by operation of the mixing regulator 60 during low duty operation of the mechanism 10. The water temperature provided by the mixing regulator 60 can be adjusted by rotating the cam 63 about its eccentric pivot which is the axis of piston rod 66. The manner in which the adjustment is accomplished will be described hereafter.

An alternate form of a blend regulator is shown in FIG. 4 and designated generally as 60'. The mixing regulator 60' can be utilized in the heating apparatus 12 of the present invention and would function to control the temperature of the water during low capacity operation and operates in a manner similar to the mixing regulator 60, shown in FIGS. 2 and 3. The mixing regulator 60' comprises a cylindrical-shaped member open at the lower end and having a mixing orifice 67 in the wall of the cylindrical-shaped member. The mixing orifice 67 is trapezoidal in shape, as shown in FIG. 5, and cooperates with a rectangular opening 68 in the tubular sleeve member 36 to provide a passageway 57' communicating the water inlet chamber 34 and mixing chamber 56.

The mixing regulator 60' controls the rate of flow of cold water into mixing chamber 56 by moving the mixing regulator 60' vertically to change the relative positions of mixing orifice 67 and opening 68. The regulator 60' has a close sliding fit with the inner surface of the open sleeve 36 and movement of the regulator 60' changes the effective size of passageway 57' by changing the relative positions of mixing orifice 67 and opening 68.

The mixing regulator 60' moves vertically relative to sleeve 36 upon movement of piston 64. The regulator 60' is fixedly connected to the lower end of piston rod 66 by a suitable connection. As the orifice 67 moves upward from the stagnant or "no flow" position illustrated in FIG. 4, the size of passageway 57' increases to a maximum and then decreases until it closes completely when the mechanism 10 is operating preferably at about 40 percent of capacity. The configurations and sizes of opening 68 and orifice 67 are such as to provide proper mixing during low duty operation of the mechanism 10 and to stop mixing when the mechanism is operating above 40 percent of capacity, at which point, piston 64 has moved the mixing orifice 67 beyond the stationary opening 68 so that the wall of the regulator 60' closes passageway 57'.

The mixing regulator 60', like the regulator 60 described heretofore, provides a substantially constant preset temperature of the heated water during low capacity operation. The water temperature provided by the regulator 60' can be adjusted by changing the position of mixing orifice 67 circumferentially relative to stationary opening 68 in sleeve 36. This adjustment will change the effective size of passageway 57' as will be readily apparent from an inspection of FIG. 5. The manner in which the adjustment is accomplished will be described hereafter.

Another alternative form of blend regulator is shown in FIG. 6 and is designated generally as 60". The regulator 60" operates in the same manner as the regulator 60'. A principal distinction over the regulator 60' is that the wall providing orifice 67 is arcuate instead of cylindrical and two flanges project radially from the top and bottom edges for connecting the regulator 60" to the piston rod 66.

The water, after being brought to the desired temperature in mixing chamber 56, flows into an outlet water chamber 70 from which it is subsequently discharged through opening 22a into water outlet line 22. In the regulator 60', the water is discharged through an opening 59 in the head of the blend regulator 60' into outlet water chamber 70.

The rate at which the heated water is discharged from the outlet chamber 70 is controlled by a valve 72. The valve 72 includes a tubular conduit 74 through which fluid is directed through piston 64. A stationary valve member 76 is arranged within the conduit 74 and is supported by a valve stem 78 detachably connected to the upper portion of housing part 30a. The conduit 74 has external threads and is removably secured in an opening provided in piston 64 by a nut 79. The conduit 74 moves with piston 64 and relative to the valve member 76 to regulate the flow of heated fluid through the valve 72.

The opening through conduit 74 has a cylindrical portion 74a and a frusto-conical-shaped portion 74b. When the valve member 76 is in engagement with bore 74a, fluid flow through the valve 72 is substantially blocked. When the conduit 74 moves relative to the valve member 76, fluid is permitted to flow about the valve member 76 through the conduit 74. The valve stem 78 has a plurality of radially extending guide members or vanes 80 which engage the inner surface of the cylindrical portion 74a of the conduit 74 and assure proper alignment of the conduit 74 and valve member 76 during relative movement. The valve 72 provides the desired metering of the water and also provides for a pressure drop across the piston 64 upon movement thereof. These functions could also be provided by utilizing a covered slot in the cylinder or housing part 30b which would direct water around the piston 64, thereby eliminating the need for the valve means through the piston.

It should be apparent from the foregoing that when a "no demand" condition exists for hot water, the water pressure in the outlet chamber 70 acting on opposite sides of the piston 64 is such as to maintain the piston 64 in its neutral position wherein the valve 72 is closed. The force to start movement of the piston can be adjusted by adjusting the force exerted by a spring 75 which biases the piston rod 66 downward. The spring 75 is adjusted by turning nut 77 mounted on a threaded portion of the piston rod 66.

Upon demand for hot water, the water pressure above piston 64 drops considerably and the piston 64 and conduit 74 move upward in the housing part 30a due to the substantial water pressure acting on the underside of piston 64. Upward movement of conduit 74 opens valve 72 and water flows therethrough. When the demand for hot water is reduced, the water pressure acting on the upper side of piston 64 increases and results in a downward movement of the piston 64 toward its neutral position which would reduce flow through valve 72. When the demand is terminated, the piston 64 will be in its neutral position, illustrated in FIG. 2, and the valve 72 will be substantially closed.

During low duty operation of the heating apparatus 12, the aforedescribed operation is all that is required to maintain a preset temperature of the heated water since the stream pressure in the heat exchange chamber 42 remains substantially constant up to this point. But as the demand exceeds a predetermined point, such as 40 percent of capacity, it is necessary to increase the stream pressure in the heat exchange chamber 42 since the increased flow of water through tubes 44 condenses the steam faster. The control means 24 operates to increase the pressure in the heat exchange chamber 42 by increasing the flow of steam through steam valve 26.

The control means 24 comprises a cam actuated valve 86 which regulates the loading of one side of the diaphragm of the steam valve 26. The valve 86 is a commercially available pressure reducing and relief valve and will not be disclosed herein in detail. Suffice it to say that upon being actuated, valve 86 establishes a particular pressure on a control fluid in a line 88 to load one side of the diaphragm of steam valve 26. In the illustrated embodiment, the control fluid utilized is water and is directed to the valve 86 through a line 90 from the water inlet line 14. Controlling the pressure in line 88 controls the setting of steam valve 26.

Figure 8:
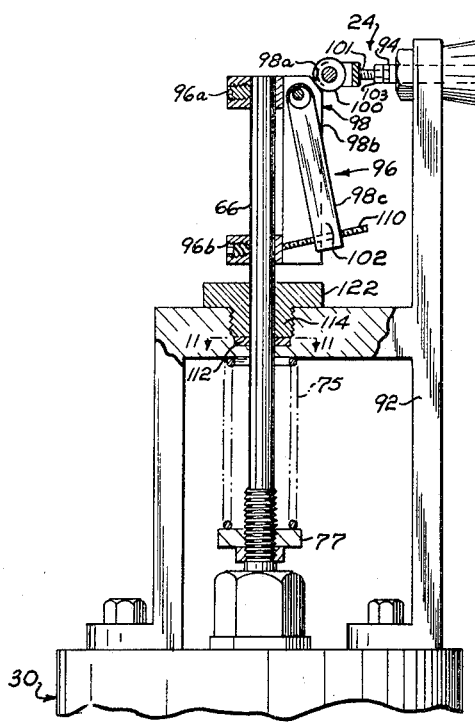
FIG. 8 is an elevational view of a portion of the fluid handling mechanism of FIG. 1 but on a larger scale.
Figures 9, 10:
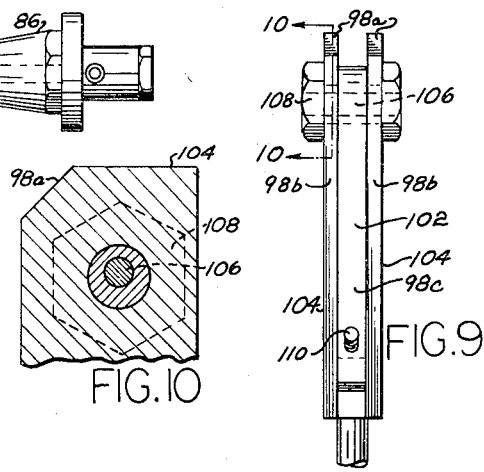
FIG. 9 is an elevational view of a part of the mechanism shown in FIG. 8 but on a larger scale.
FIG. 10 is a sectional view taken approximately along line 10—10 of FIG. 9.
Figure 11:
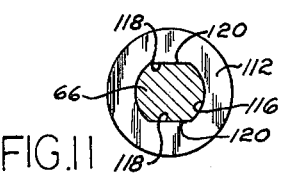
FIG. 11 is a sectional view taken approximately along line 11—11 of FIG. 8.

The cam actuated valve 86 is supported on the upper side of the housing 30 by a frame 92 so that part of a valve stem 94 extends generally horizontally beyond one side of the frame 92. The valve 86 is operated in response to demand for hot water by a cam actuator 96. The cam actuator 96 is detachably secured by lock screws 96a and 96b to the upper end of the piston rod 66 and moves with the piston rod 66. The lock screws 96a, 96b provide for adjustment of the cam 96 along piston rod 66 to permit proper positioning thereof and compensate for manufacturing tolerances. The cam actuator 96 has a cam surface indicated generally as 98 and which cooperates with a cam follower 100 secured to the end of the valve stem 94. The adjustment provided by the lock screws 96a, 96b permits positioning of cam surface 98 relative to follower 100 to set the starting point of operation of the cam 96. Vertical movement of the cam surface 98 relative to the cam follower 100 moves the valve stem 94 in the body of valve 86 to control the fluid pressure acting on the steam valve 26. The cam surface 98 comprises three surface portions designated 98a, 98b, and 98c. When there is no demand for water, the cam actuator 96 is positioned on piston rod 66 so that cam surface 98a is engaged by cam follower 100. This relationship sets valve 86 so that the fluid pressure in line 88 closes steam valve 26. As the demand for water is initiated, the piston 64 moves vertically as described heretofore and the cam surface portion 98b engages the cam follower 100 and moves the valve stem 94 to the right, as viewed in FIG. 8. Valve 86 is now set to load steam valve 26 and establish a predetermined steam pressure in the heat exchange chamber 42. Cam follower 100 maintains engagement with cam surface portion 98b and maintains a substantially constant low steam pressure in heat exchange chamber 42. When the mechanism is operating at high duty, which is preferably 40 percent of capacity, the cam follower 100 engages the third cam surface portion 98c. Above 40 percent of capacity, the cam follower 100 rides up the inclined cam surface portion 98c and valve 86 is set to set steam valve 26 to increase the steam pressure in heat exchange chamber 42.

The steam pressure required to provide a particular rate of condensation of steam in the heat exchange chamber 42 is set in relation to the back pressure on the steam. The difference between the steam pressure and back pressure in chamber 42 should be such as to provide the desired condensation rate. During low capacity operation of mechanism 10, a relatively low constant steam pressure is provided if the mechanism 10 is in a system providing very little back pressure, such as a system where the steam trap 20 is vented to atmosphere. However, if mechanism 10 is employed in a system which produces a substantial back pressure on the steam in chamber 42, such as system having a closed steam cycle, the steam pressure will have to be increased accordingly.

The present invention provides an external adjustment of the control means 24 and in particular of the cam actuated valve 86 to readily adapt the mechanism 10 for use in either of the systems described heretobefore. The adjustment provides for changing the setting of valve 86 so that steam valve 26 provides the necessary steam pressure immediately upon demand for hot water. The adjustment is provided by a threaded bolt 101 fixed to the support bracket for the cam follower 100 and which is received in internal threads in stem 94 and locked with nut 103.

The steam pressure is adjusted by turning stem 94 relative to bolt 101. The adjustment changes the setting of valve 86 by changing the relitave positions of valve stem 94 and the body of valve 86. The adjusted setting of valve 86 will open steam valve 26 when demand for hot water is initiated to immediately establish the proper pressure in chamber 42 to counteract the back pressure and provide the desired steam condensation rate.

The temperature of the water can be adjusted during high duty operation by adjusting cam surface portion 98c. Cam surface portion 98c is provided by one side of an elongated member 102. The member 102 is pivotally supported between spaced interconnected plates 104 of cam actuator 96 by a shaft 106. One side of plates 104 provides cam surface portions 98a and 98b. The ends of shaft 106 are received in journals 108 which are rotatably supported by plates 104. The shaft 106 is supported in the journals 108 so that its longitudinal axis is offset from the axis of rotation of journals 108 in plates 104. Rotation of journals 108 adjusts member 102 generally longitudinally of plates 104 due to eccentric mounting arrangement. Member 102 has a threaded opening in the lower ends which receives a threaded member 110. Rotation of member 110 pivots the elongated member 102 about the axis of shaft 106.

The point in the cycle, i.e., the percentage of total capacity at which cam surface portion 98c engages cam follower 100 to control water temperature by controlling the steam pressure in heat exchange chamber 42, is set by rotation of eccentric journals 108. The water temperature during steam control can be adjusted by adjusting the inclination of cam surface portion 98c by rotation of the threaded member 110.

The present invention also provides for adjusting the temperature of water during the low duty operation as described heretofore. The temperature adjustment is made by rotating the cam 63 of mixing regulator 60 or the walls of mixing regulators 60' and 60". Rotation of the eccentrically mounted cam 63 changes the settings of head portion 61a relative to tubular member 58 which changes the volume of flow of cold water into chamber 42 during mixing. Rotation of the walls of mixing regulator 60' or 60" changes the position of the mixing orifice 67 circumferentially relative to the fixed fluid opening 68. Since mixing orifice 67 is of general trapezoidal configuration with the long sides being non-parallel, rotation of regulator 60' or 60" increases or decreases the effective size of passageway 57' depending upon the direction of rotation and, in turn, varies the volume of cold water admitted to mixing chamber 56.

The aforedescribed adjustment of the mixing regulators 60, 60' and 60" is accomplished by rotating piston rod 66. The piston rod 66 is supported for vertical reciprocation through frame 92 by a guide washer 112 positioned in a well 114 in frame 92. Opening 116 in guide washer 112 has two straight sides 118 which cooperate with flats 120 provided on the upper end of piston rod 66 to prevent relative rotation between piston rod 66 and washer 112. The washer 112 is held against rotation in well 114 by a threaded member 122. The threaded member 122 has a central opening through which the piston rod 66 extends and threadedly engages threads provided in well 114. By turning the sleeve 122 in one direction, the force exterted thereby on washer 112 is relieved and the piston rod 66 and washer 112 can be rotated to adjust cam 63 or orifice 67 circumferentially. Piston rod 66 has a running fit in piston 64 and is free to rotate without rotating the piston. When the cam 63 or orifice 67 is set, the threaded member 122 is turned in the opposite direction and holds the washer and piston rod against rotation.

From the foregoing, it should be apparent that the rate of flow of the water from the heating apparatus 12 and the water temperature is controlled by the movement of the piston rod 66. In the event the piston rod binds and fails to move in response to pressure differential, a safety device is provided by the present invention to shut off the steam flow to the heat exchange chamber 42 to prevent excessive heating of the water. The safety device comprises a temperature resposive relief valve 126 which is secured to the upper part of housing 30a. The relief valve 126 is in communication with the fluid line 88 which loads steam valve 26. The relief valve 126 operates to relieve the pressure in water line 88 and causes the steam valve 26 to close and block flow of steam into the heat exchange chamber 42 when the temperature of the water in outlet chamber 70 exceeds a predetermined temperature.

The valve 126 includes a valve body 128 which is suitably secured by a member 130 in an opening 132 provided in the upper housing part 30a. The valve body 128 has a passageway 134 which communicates with the fluid conduit 88 and an outlet port 136. The flow from passageway 134 to outlet port 136 is controlled by a valve member 138. The valve member 138 is biased toward its closed position by a spring member 140 acting between a washer 142 and the head of valve member 138.

A temperature sensing member 144 controls the operation of the relief valve by controlling the loading of spring 140. The water temperature sensing member 144 extends from the securing member 130 into the water outlet chamber 70, and includes an outer sheath 146 which completely encases one end of a rod 148. The rod 148 is movable relative to sheath 146 and the right-hand end of rod 148, as viewed in FIG. 2, abuts against washer 142. The sheath 146 is constructed of a material having a higher coefficient of expansion than the solid rod 148 and, consequently, will expand a greater extent than rod 148 for a given temperature.

When the temperature in the outlet chamber 70 exceeds a predetermined safe temperature, the sheath 146 will expand to the left, as viewed in FIG. 2, at a greater rate than rod 148, thereby creating a small space between the cooperating ends of the sheath 146 and rod 148. This spacing permits the rod 148 to be shifted axially to the left by the spring 140 acting on the washer 142 and is the relative position of the parts shown in FIG. 2. The expansion causes the washer 142 to engage seat 142a in the valve body 128 thereby increasing the distance between the surfaces against which the spring acts. The increased distance reduces the preloading force on spring 140 and the water pressure in passageway 134 will overcome any valve closing force and move the valve member 138 to the left relieving the fluid pressure in line 88. When the pressure in line 88 is relieved, the steam valve 26 closes and shuts off the flow of steam into heat exchange chamber 42.

When the defect causing overheating of the water is corrected and the temperature in outlet chamber 70 drops below the safe maximum temperature, the sheath 146 will contract and move rod 148 to the right so that washer 142 unseats or moves away from washer seat 142a and thereby increases the force exerted by spring 140 on valve member 138. When so positioned, the water pressure in line 88 will not be sufficient to overcome the force exerted by spring 140 and the cam actuated valve 86 will operate as described heretofore to control the loading of the steam valve 26. Valve 138 has a stem which protrudes through washer 142 and receives a clip so that valve 138, washer 142, and spring 140 are an assembly. During extremely cold conditions, rod 148 is free to move to the right by compressing the spring 140 and avoid undue pressure of valve 138 against its seat in passageway 134.

From the foregoing, it should be apparent that a relatively simple and effective fluid handling mechanism has been provided by the present invention which is capable of heating one fluid by another fluid to a controlled adjustable temperature. An important economic advantage provided by the construction of the illustrated embodiment is that the basic elements thereof are used to provide various capacities of a heating apparatus. To change the capacity of the mechanism 10, it is only necessary to install a valve 72 and a mixing regulator 60 of a particular size to provide the desired capacity, plus increasing tube length or heat transfer surface. The other parts remain the same and, consequently, only one basic unit size is made and it can be readily adapted to provide a variety of capacities.

Moreover, it should be apparent that applicant has provided a fixed surface instantaneous type of heat exchanger, where steam is the heating fluid, and the desired temperature of the heated fluid is below 212° F., satisfactory control of heated fluid temperature can only be achieved by mixing a portion of the heated fluid with an unheated portion of the same fluid which bypasses the heat exchanger, when the duty on the heat exchanger is approximately 40 percent of rated capacity, or less. Stated another way, when a fixed surface instantaneous heat exchanger is sized for a definite duty at a positive operating steam pressure, it requires 0 p.s.i.g. steam pressure (212° F.) to handle the duty when same is approximately 40 percent of rated capacity, or less. Thus, mixing below approximately 40 percent of rated capacity is mandatory.

It has been discovered that the ideal method of controlling a steam heated fixed surface instantaneous heat exchanger must be broken down into three integrated phases, as follows:

Phase No. 1 is the stagnan or no flow condition where steam flow is stopped, and steam pressure is zero. This is required to prevent overheating the water, and inducing rapid fouling of the heat exchange surface.

Phase No. 2 is when the duty on the exchanger is somewhere between zero and approximately 40 percent of rated capacity. During this period two conditions ensue. The first is that the controlled steam pressure be held at a fixed constant value, and the second is that mixing of heated fluid and an unheated portion of the same fluid occurs in a controlled relationship. The ideal control mode will provide for adjustment of the fixed value of the steam pressure at some constant value that will handle the steam condensate back pressure condition found at each installation.

Phase No. 3 is when the duty on the exchanger is between approximately 40 percent and 100 percent of rated capacity. Here mixing of heated and unheated fluid can cease altogether, and control of steam pressure to the exchanger becomes the sole control mode. However, satisfactory control can be achieved by permitting mixing of heated and unheated fluid to 100 percent of rated capacity at the expense of inefficient use of the heat exchange surface.

Although the illustrated embodiment of the present invention has been described herein in considerable detail, it is intended to cover all modifications, changes, and adaptations thereof.

Having described my invention, I claim:

1. A fluid handling mechanism for heating a first fluid to a predetermined temperature by a second fluid comprising a heat exchange chamber and a combination mixing and actuator chamber, means for directing the first fluid into said heat exchange chamber wherein said first fluid is heated and after heating into said mixing chamber, means for bypassing first fluid to said mixing chamber without flowing through said heat exchange chamber, means for directing the first fluid to a use location, means for directing the second fluid into and from said heat exchange chamber, and a mechanism for controlling flow of said first and second fluids in response for demand of said first fluid including first means for controlling the second fluid to zero flow during a first phase condition in which there is no demand for first fluid, second dual control means for establishing constant pressure of the second fluid on said heat exchange chamber and for controlling the bypassing of the heat exchange chamber by a portion of the first fluid during a second phase in which there is an intermediate demand for first fluid in order to hold the temperature of the mixed first fluid substantially constant, and third means for increasing the pressure of the second fluid in said heat exchange chamber during a third phase in which there is a high demand for first fluid in order to hold the temperature of first fluid constant, said mechanism including an actuator member and a valve means, said valve means comprising flow metering means for the first fluid which establishes a desired pressure differential across said actuator member upon demand for the first fluid, a loading regulator means having a source of motive pressure and operated by movement of said actuator member, and a differential diaphragm actuated valve means for controlling the second fluid pressure to said heat exchange chamber and having a diaphragm one side of which is loaded by said loading regulator biasing the valve means toward an open position and the other side of which is loaded by second fluid pressure in said heat exchange chamber biasing the valve means toward a closed position.

2. A fluid handling mechanism as defined in claim 1 wherein said no demand operation is accomplished by control means for unloading motive pressure from said differential diaphragm actuated valve.

3. A fluid handling mechanism as defined in claim 1 wherein said intermediate demand operation comprises operation up to about 40 percent of capacity and said high demand operation comprises above about 40 percent of capacity.

4. A fluid handling mechanism as defined in claim 1 wherein said actuator member is operatively connected with a cam member and said cam member operates a bypass control.

5. A fluid handling mechanism as defined in claim 1 wherein said bypass is internal and free of external conduits.

6. A fluid handling mechanism as defined in claim 1 wherein zero flow of said second fluid permits cooling of said first fluid in said heat exchange chamber thereby curtailing fouling of the heat exchange surfaces.

7. A fluid handling mechanism as defined in claim 1 wherein said actuator member comprises a piston mounted for reciprocation in an operator chamber which communicates with said heat exchange chamber, said piston movable in response to a change in fluid pressure acting on opposite sides thereof caused by a change in demand for the heated first fluid.

8. A fluid handling mechanism as defined in claim 4 further including means via close fitting sliding parts whereby the piston substantially prevents flow of the first fluid past the piston at initiation of demand until a large force builds up on the piston thereby insuring positive finite movement of the piston at minimum demand.

9. A fluid handling mechanism as defined in claim 7 wherein second control means for controlling the pressure of the second fluid in said heat exchange chamber is operable in response to initial movement of said piston to provide an abrupt rise in pressure in said heat exchange chamber from zero pressure to a predetermined pressure at minimum flow, and external means for adjusting the extent of initial movement of said piston to set the predetermined pressure of said second fluid in said heat exchange chamber.

10. A fluid handling mechanism as defined in claim 9 wherein said piston is biased to a no demand position by a spring which is overcome upon a predetermined demand.

11. A fluid handling mechanism as defined in claim 7 wherein said second means comprises a mixing area through which the first fluid is adapted to flow from said heat exchange chamber to said outlet chamber, bypass regulator means operatively connected to said piston and movable thereby to direct a predetermined variable volume of the unheated first fluid into said mixing area during the low demand operation and operable to stop flow of the unheated first fluid into the mixing area during the high demand operation.

12. A fluid handling mechanism as defined in claim 7 wherein said third means includes cam actuated valve means and a cam actuator for said cam actuated valve means operatively connected to said piston and movable therewith to provide a substantially constant pressure of the second fluid in said heat exchange chamber during said low demand operation and to increase the pressure of the second fluid as the demand on the mechanism increases during said high demand operation.

13. A fluid handling mechanism as defined in claim 12 wherein said cam actuated valve means includes means for adjusting the initial pressure of the second fluid in said heat exchange chamber to handle any condensate back pressure condition that can be encountered in a system in which the mechanism is installed.

14. A fluid handling mechanism as defined in claim 12 wherein said cam actuated valve means includes a fluid conduit for directing a fluid under pressure to said diaphragm actuated valve means and temperature responsive valve means for relieving the fluid pressure in said fluid conduit when the temperature of the first fluid in said outlet chamber reaches a predetermined maximum temperature.

15. A fluid handling mechanism as defined in claim 1 wherein said second means includes means for adjusting the temperature of the first fluid.

16. A fluid handling mechanism as defined in claim 1 wherein said third means includes means for adjusting the temperature of the first fluid.

17. A fluid handling mechanism as defined in claim 1 further including means for adjusting the point at which the high demand operation of the mechanism commences.

18. A fluid handling mechanism for heating a first fluid to a predetermined temperature by a second fluid comprising a heat exchange chamber, means for directing the first fluid into and from said heat exchange chamber, means for directing the second fluid into said heat exchange chamber, first means for controlling the temperature of the first fluid only during a first capacity range of operation of the mechanism by directing a predetermined amount of fluid which has a lower temperature than the first fluid after heating to mix with the first fluid after heating thereof, and second means operating to control the temperature of the first fluid only during a second capacity range of operation of said mechanism higher than said first range and effective to vary the pressure of said second fluid in said heat exchange chamber during operation of said mechanism only in said higher capacity range.

19. A fluid handling mechanism for heating water by steam comprising means defining a heat exchange chamber into which the steam flows, a fluid inlet chamber for directing the first fluid into said heat exchange chamber, fluid conduit means communicating with said fluid inlet chamber for directing the water through the heat exchange chamber, means defining a mixing area communicating with said fluid conduit means, means for directing a controlled amount of the water into said mixing area, said means for directing a controlled amount of the water comprises bypass regulator means for mixing cold water and hot water up to a predetermined rate of fluid flow from said mechanism, said bypass regulator means comprising a passageway communicating with said inlet chamber and said mixing area, a flow control member for controlling the flow of water through said passageway in accordance with the relative positions of said member and said passageway, means defining a cam actuator for said member and operable to change the relative positions of said member and said passageway, and means for moving said cam actuator relative to said member to vary the flow of cold water, and means for adjusting the temperature of the water comprising means mounting said cam actuator for rotation about an eccentric axis and means for rotating said cam actuator about said eccentric axis to change the relative positions between said member and said passageway.

20. A fluid handling mechanism comprising a heat exchange chamber in which one fluid is heated by another, a pressure responsive valve for controlling the flow of the other fluid to said heat exchange chamber, means for directing the one fluid into and from said heat exchange chamber, fluid conduit means for directing a fluid under pressure to load said pressure responsive valve and a temperature responsive valve for relieving the pressure in said fluid conduit means and close said pressure responsive valve when the temperature of the first fluid reaches a predetermined maximum temperature, an outlet chamber in communication with said heat exchange chamber, a piston means including a part in said outlet chamber movable in response to demand for the one fluid in said outlet chamber, and said means for loading said pressure responsive valve includes a cam actuated valve means, and cam actuator means movable with said piston means and operable to control said cam actuated valve.

21. A fluid handling mechanism as defined in claim 20 wherein said cam is carried on a stem connected with the piston member and is adjustable relative thereto providing for compensation for manufacturing tolerance.

22. A fluid handling mechanism comprising first and second parts movable relatively, said first part comprising a tubular conduit and said second part being located in said conduit, said tubular conduit having a valve bore and said second part being engageable with said valve bore to substantially prevent fluid flow through said conduit, means for moving one of said parts relative to the other of said parts to provide for fluid flow through said tubular conduit, said one part having a frusto-conical surface movable relative to said other part to provide flow through said tubular conduit of increasing volume as the relative distance of movement between said parts increases, said means for moving said one of said parts comprising a piston movable in response to a difference in fluid pressures acting on opposite sides thereof, and means for connecting said one part to said piston to provide for movement of said one part with said piston relative to said other part.

23. A fluid handling mechanism as defined in claim 22 wherein said one part is said tubular conduit and said means for connecting said conduit to said piston includes an opening in said piston for receiving said one part and means for detachably connecting said one part to said piston.

24. A fluid handling mechanism for heating one fluid by another comprising a shell member defining a heat exchange chamber for heating the one fluid into which the other fluid is directed, fluid conduit means in said chamber and through which the one fluid is adapted to flow, said fluid conduit means comprising an annular array of spaced straight tubes including an outer array of circumferentially spaced straight tubes, an annular baffle which separates the adjacent ends of said outer array from the ends of the other tubes, means defining a second chamber communicating with one end of said tubes and providing for fluid flow between said outer tubes and said inner tubes, means for directing the one fluid to said tubes including an inlet chamber defined in part by said baffle and in communication with said outer tubes and an outlet chamber for the one fluid in communication with said inner tubes, and a mixing area located within said shell and communicating with said heat exchange and outlet members, said mixing area having means for directing one fluid at a substantially lower temperature than the heated one fluid into said mixing area from said inlet chamber to control the temperature of the one fluid.

25. A heat exchanger mechanism for heating a first fluid by steam comprising a housing, means defining a steam chamber in said housing and into which the steam is directed, control means for controlling flow of steam into said steam chamber, first fluid conduit means for directing the first fluid through said steam chamber to effect heating thereof, means defining an outlet chamber in said housing for the first fluid, an actuator member in said outlet chamber and movable therein upon a demand for the first fluid, second fluid conduit means for directing the first fluid from said outlet chamber to a use location, valve means associated with said actuator member to produce a desired pressure differential across said actuator member and thereby control movement thereof, and means for activating said control means in accordance with movement of said actuator member.

26. A heat exchanger mechanism as defined in claim 25 wherein said valve means includes relatively movable first and second parts, said first part comprising a tubular conduit and said second part being disposed in said tubular conduit, the fluid flow through said conduit being controlled by the relative positions of said parts.

27. A heat exchanger mechanism for heating a first fluid by steam comprising a housing, means defining a first chamber in said housing and into which the steam is directed, fluid conduit means for directing the first fluid through said first chamber to effect heating thereof, means defining a second chamber adjacent said first chamber in said housing for the first fluid, first fluid conduit means for directing said first fluid from said second chamber to a use location, valve means in said second chamber for controlling the flow of the first fluid from said second chamber and into said first fluid conduit means, said valve means including relatively movable first and second parts, said first part comprising a tubular conduit and said second part being disposed in said tubular conduit; and wherein one of said parts has a frusto-conical surface and the other of said parts has a cylindrical surface whereby the rate of flow through said tubular conduit increases as the extent of relative movement between parts increases.

28. A heat exchanger mechanism for heating a first fluid by steam comprising a housing, means defining a first chamber in said housing and into which the steam is directed, fluid conduit means for directing the first fluid through said first chamber to effect heating thereof, means defining a second chamber adjacent said first chamber in said housing for the first fluid, first fluid conduit means for directing said first fluid from said second chamber to a use location, valve means in said second chamber for controlling the flow of the first fluid from said second chamber and into said first fluid conduit means, said valve means including relatively movable first and second parts, said first part comprising a tubular conduit and said second part being disposed in said tubular conduit, the fluid flow through said conduit being controlled by the relative position of said parts, means for moving one of said parts relative to the other of said parts and including a piston in said second chamber movable in response to a difference in first fluid pressure acting on opposite sides thereof produced by the demand for said first fluid, and means for connecting said first part to said piston whereby said first part moves with said piston.

29. A fluid handling mechanism for heating water by steam comprising a housing, said housing defining a heat exchange chamber into which the steam flows, a fluid inlet chamber in said housing for directing the water into said heat exchange chamber, fluid conduit means communicating with said fluid inlet chamber for directing the water through said heat exchange chamber, means defining a mixing chamber in said housing contiguous to said heat exchange chamber and communicating with said fluid conduit means, an actuator member defining at least in part said mixing chamber, said actuator member being movable in response to demand for said water, and bypass means for directing water from said inlet chamber to said mixing chamber without flowing through said fluid conduit means, said bypass means including means providing a fluid passageway between said inlet chamber and said mixing chamber, a flow control member in said housing for controlling the flow of water through said bypass means, and means in said housing for moving said flow control member to change the flow of water through said fluid passageway in response to movement of said actuator member.

30. A fluid handling mechanism as defined in claim 29 wherein said bypass means operates to bypass cold water to said mixing chamber only during operation below a fixed percentage of capacity operation.

31. A fluid handling mechanism as defined in claim 29 wherein said means for moving said flow control member comprises a cam member associated with said actuator members the surface of which is shaped to position the flow control member in response to movement of the cam member.

32. A fluid handling mechanism as defined in claim 31 further including a spring member which biases the flow control member against said cam member.

References Cited

UNITED STATES PATENTS

| | | | |
|---|---|---|---|
| 2,050,279 | 8/1936 | Dahl | 236—18 |
| 2,296,325 | 9/1942 | Bak | 236—18 |
| 1,011,314 | 12/1911 | Canner | 251—353 XR |
| 1,738,087 | 12/1929 | Wadsworth | 236—23 |
| 1,773,976 | 8/1930 | Erickson | 236—12 XR |
| 2,006,035 | 6/1935 | Stewart | 236—23 |
| 3,222,500 | 12/1965 | Small et al. | 165—40 XR |
| 3,232,336 | 2/1966 | Leslie et al. | 165—38 |
| 3,316,961 | 5/1967 | Dorner | 165—145 |

FOREIGN PATENTS 67,002 11/1914 Austria.

FRED C. MATTERN, Jr., Primary Examiner

M. A. ANTONAKAS, Assistant Examiner

U.S. Cl. X.R.

165—40, 145; 251—353; 236—18, 23